INVENTORS.
GEORGE J. GENDRON
KENNETH D. GARNJOST
BY ALFRED J. MASTROPOLE
ATTORNEYS

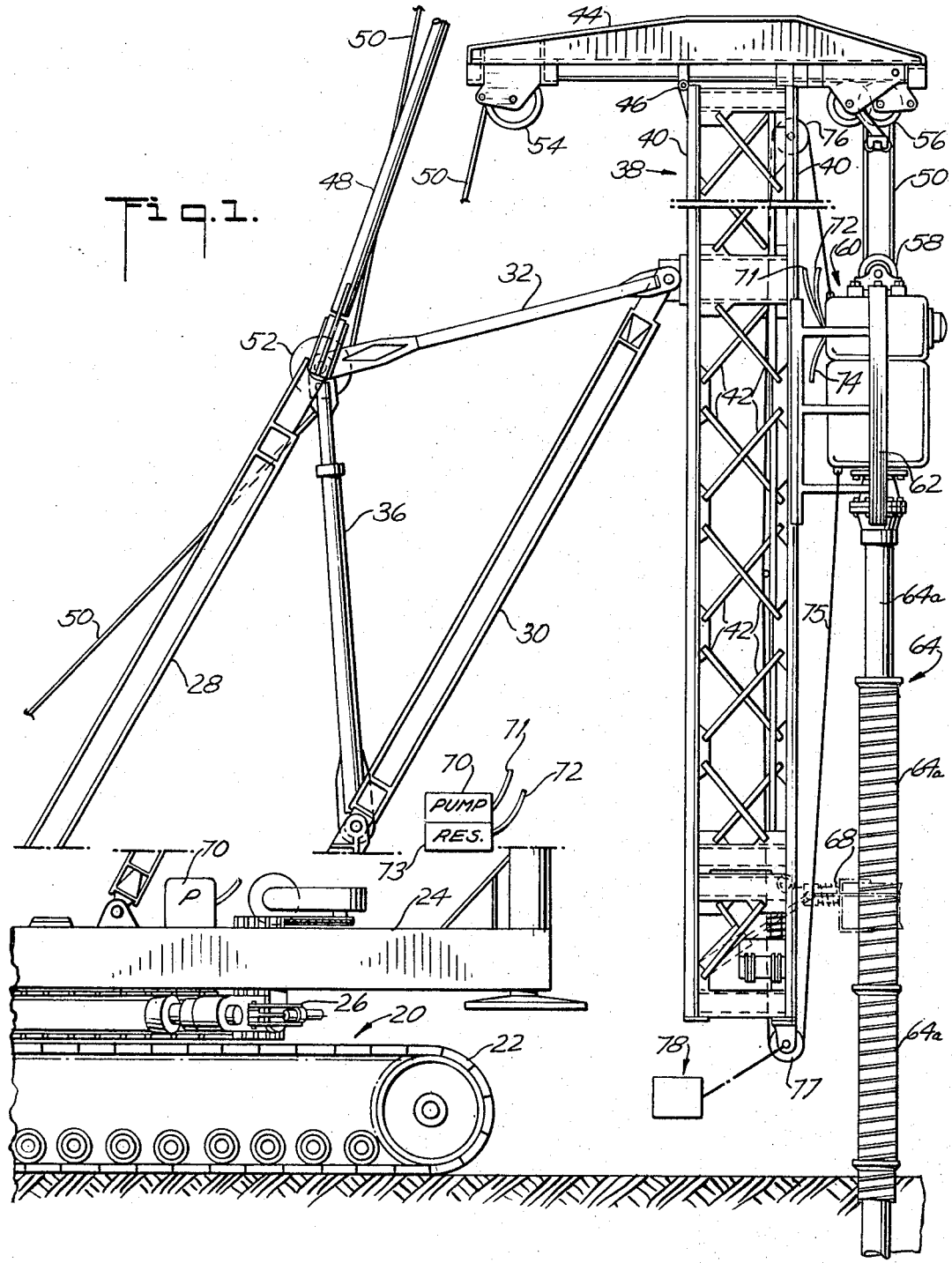

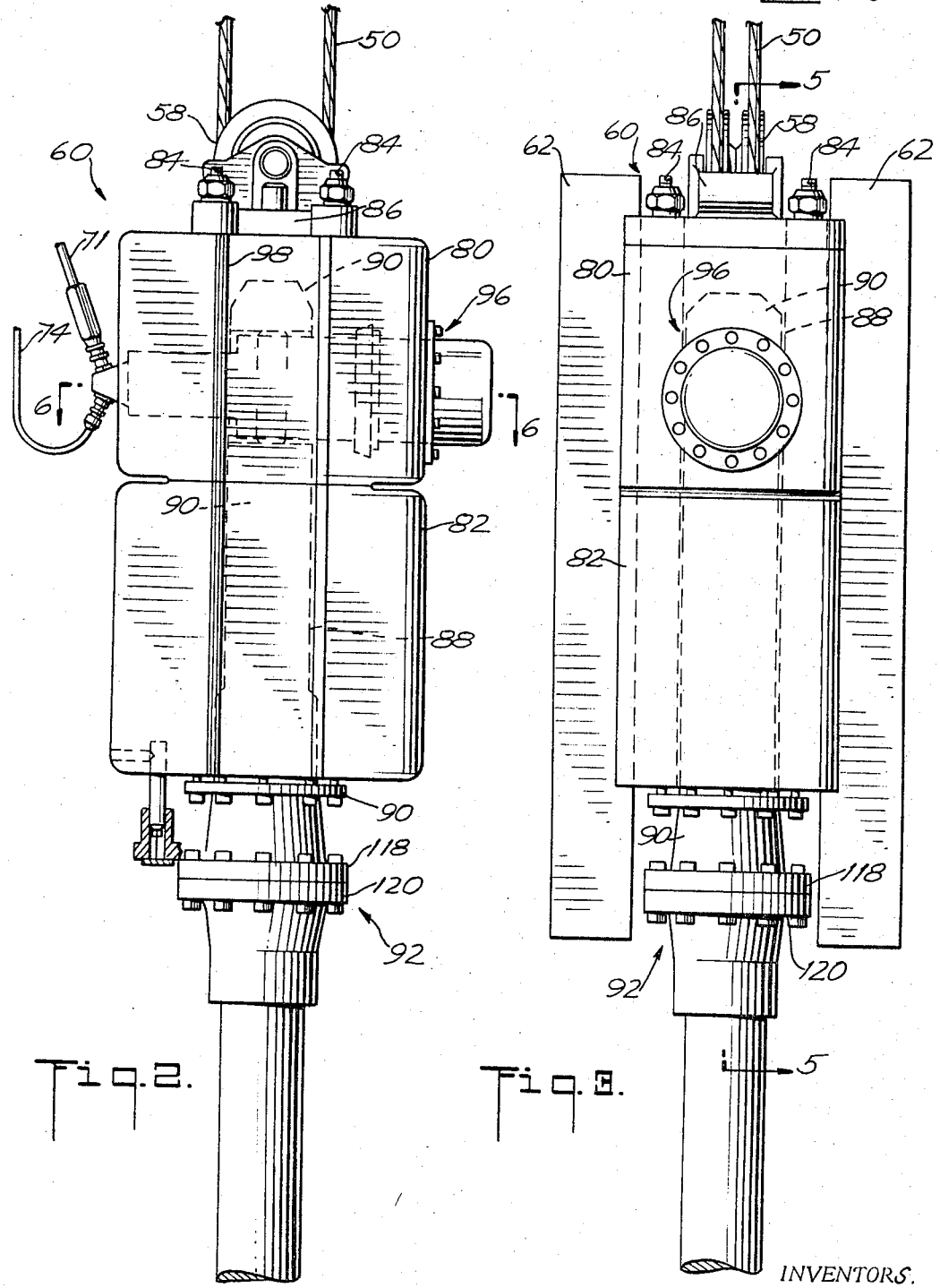

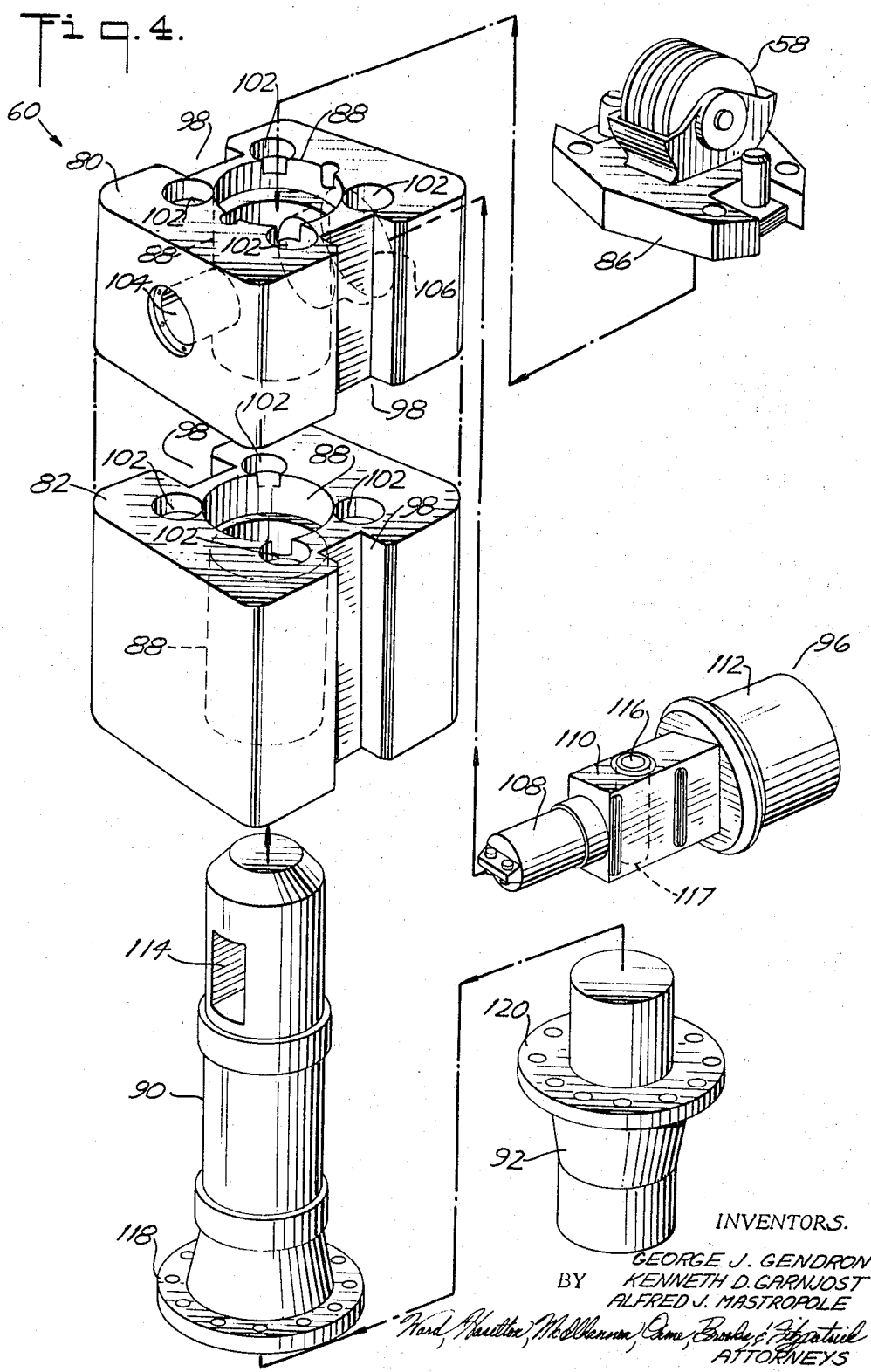

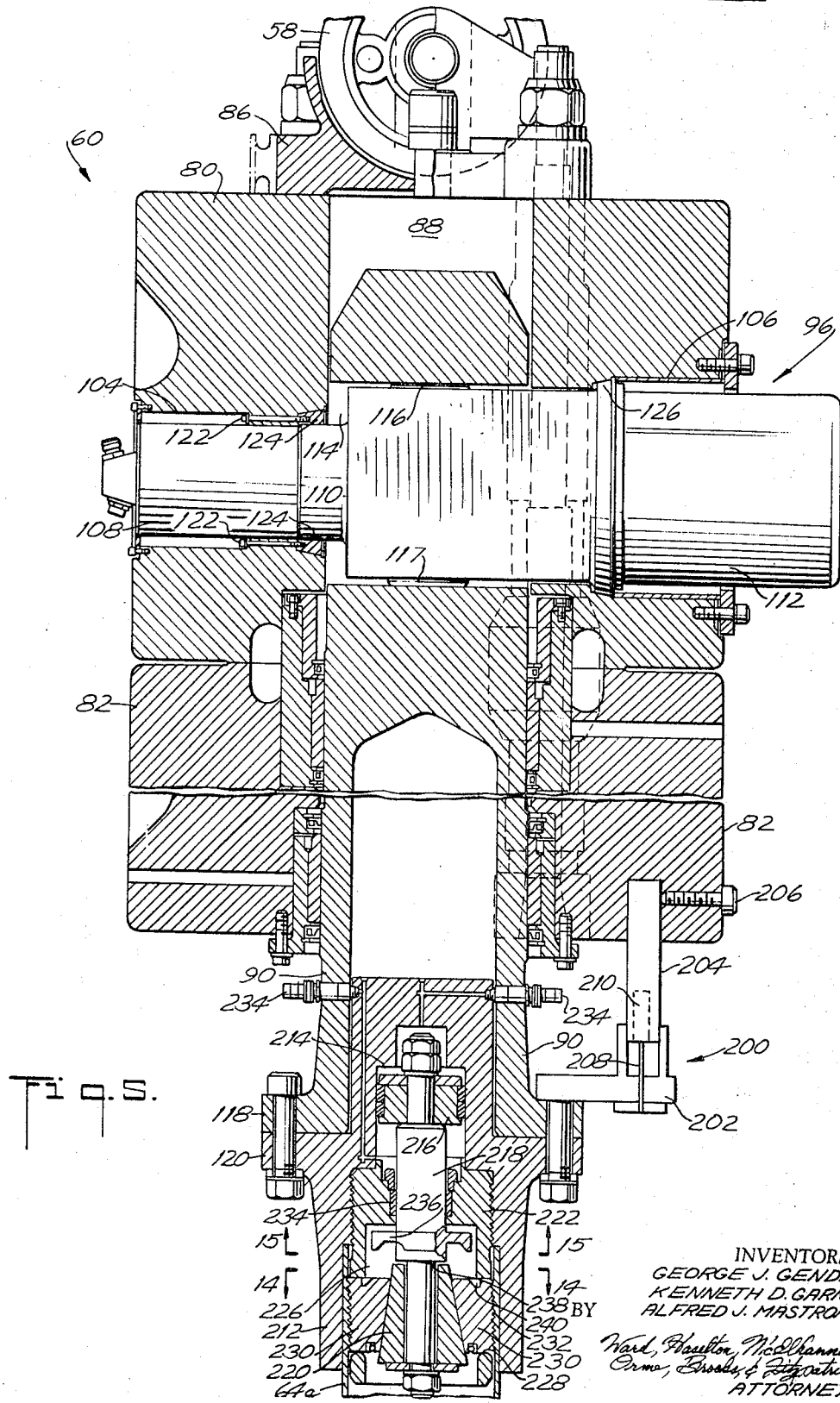

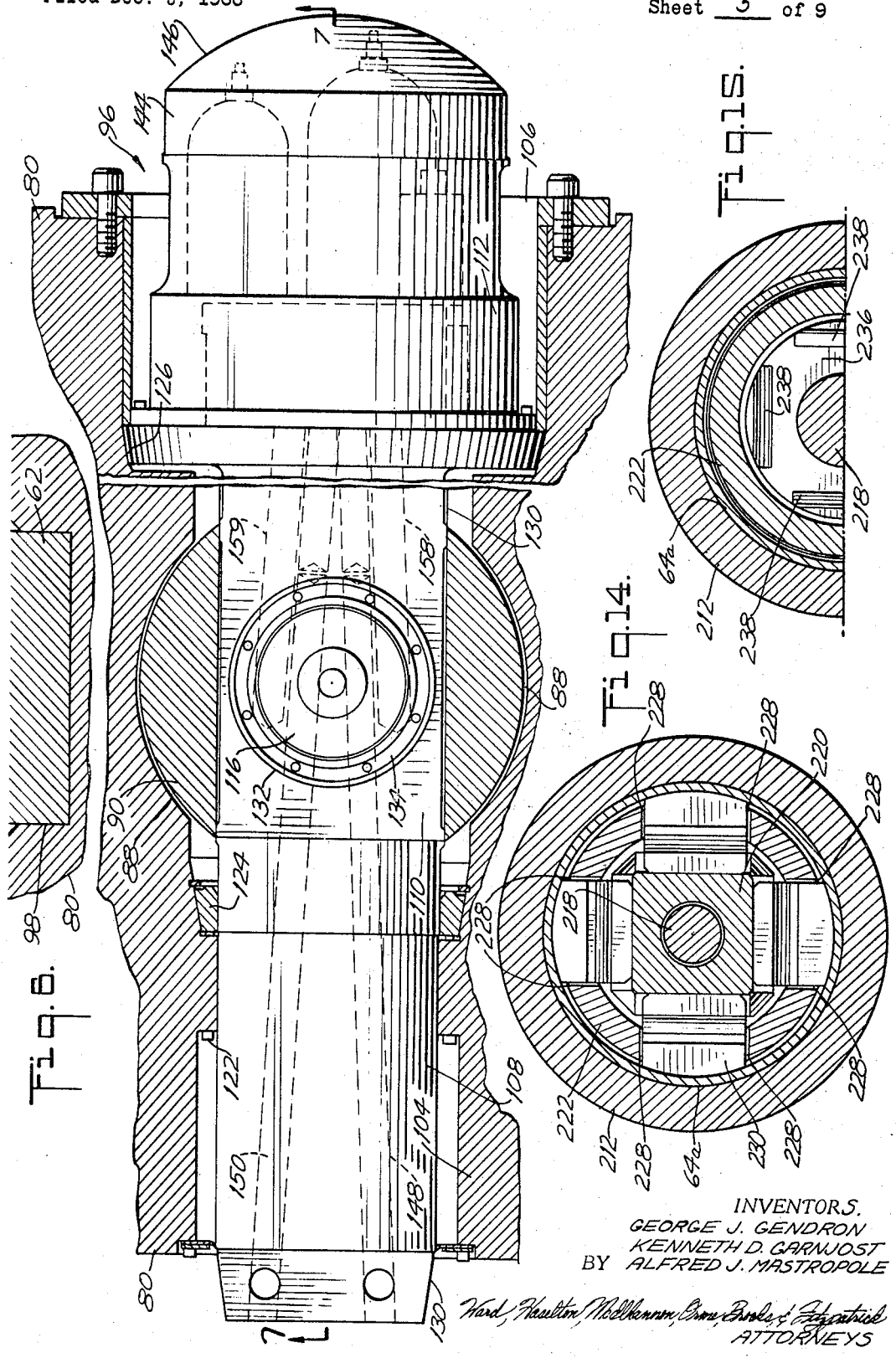

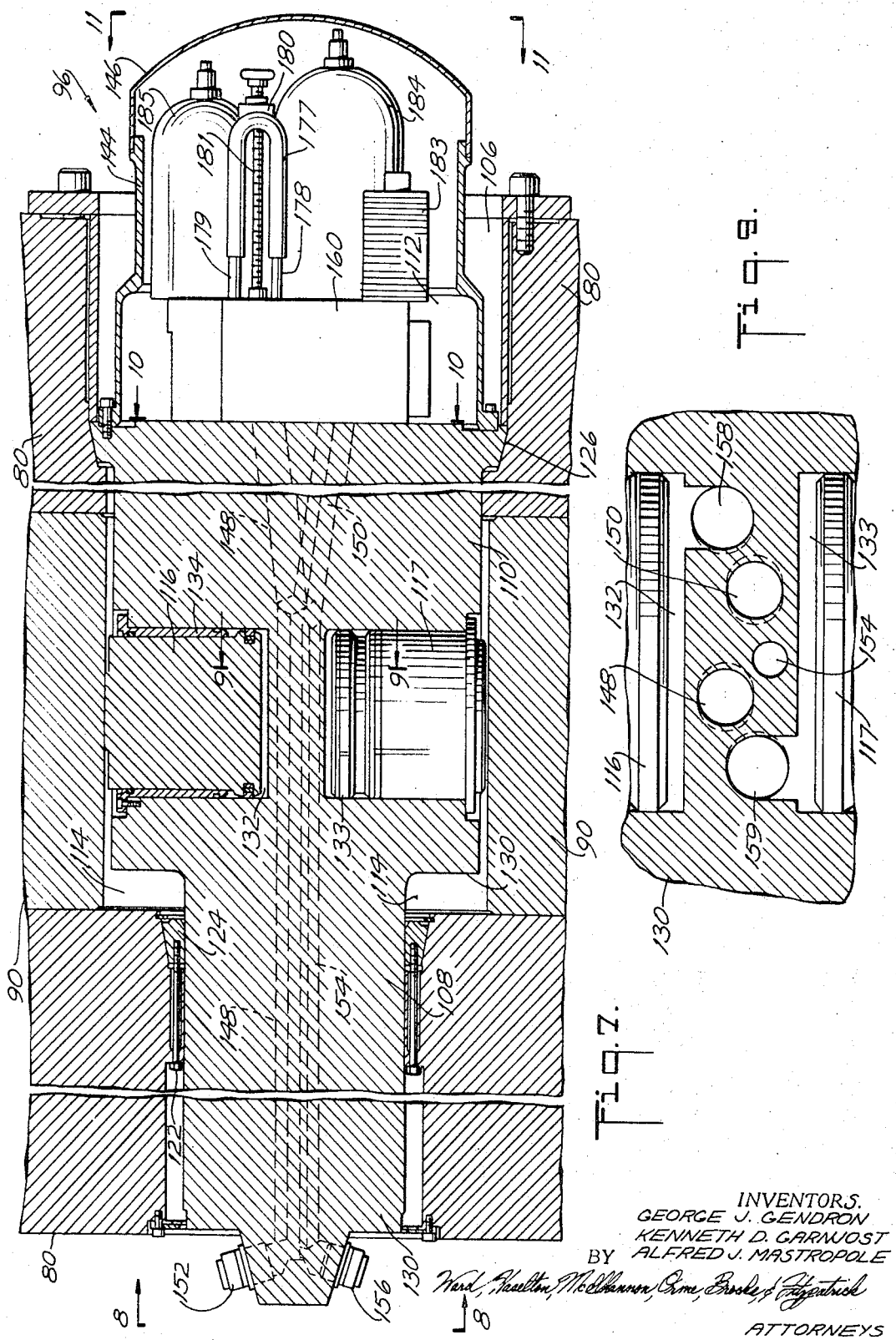

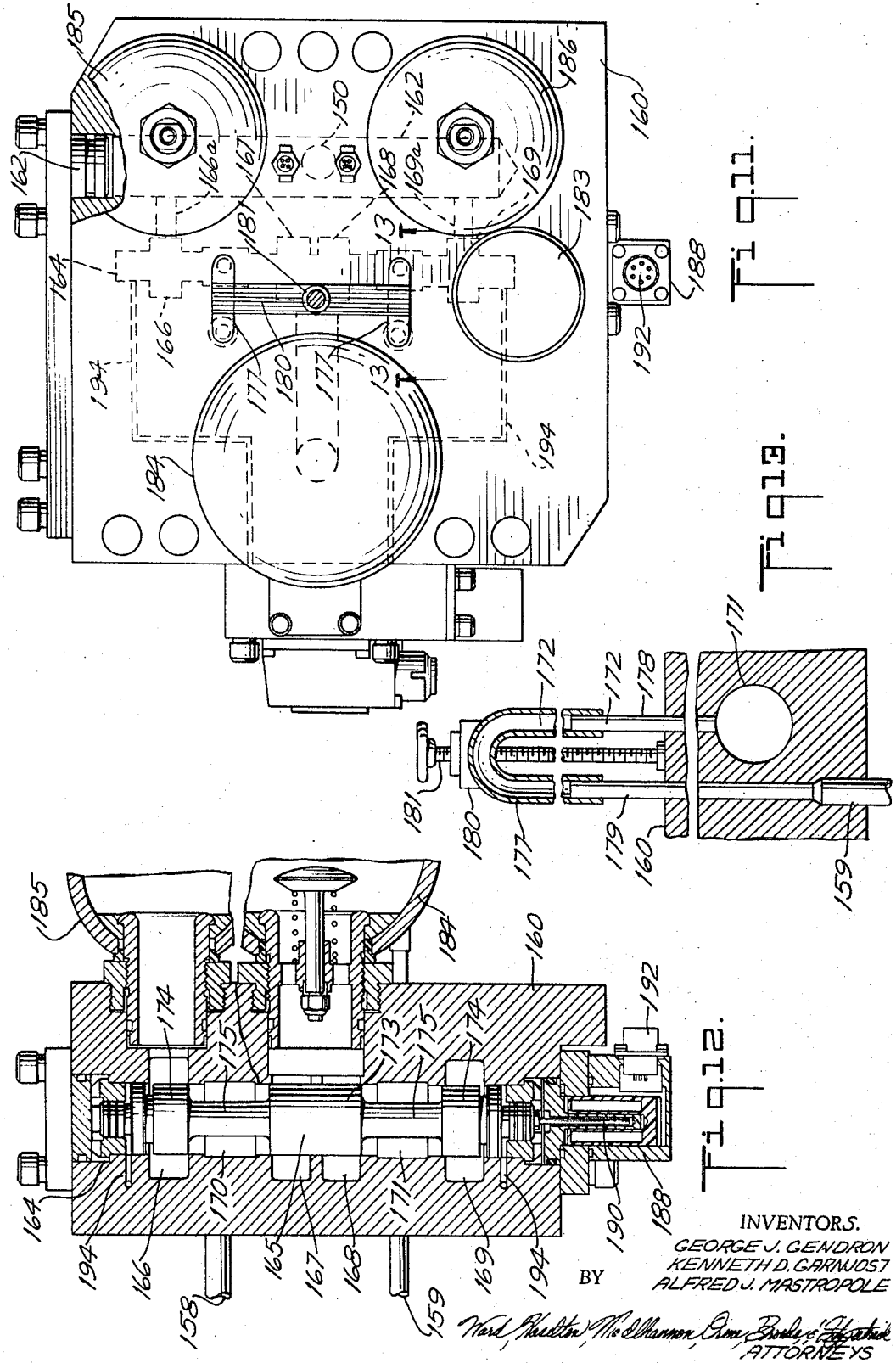

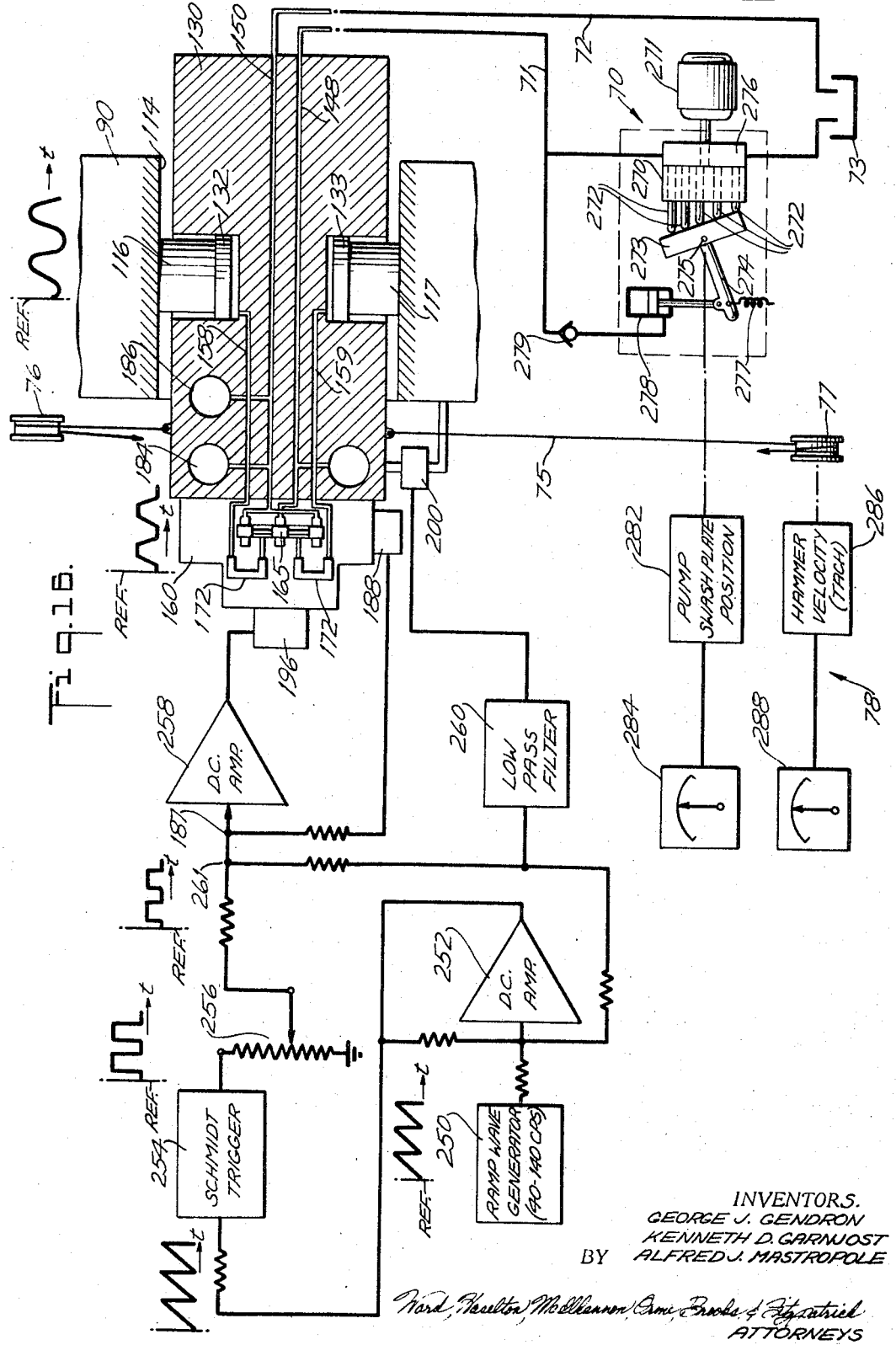

United States Patent Office 3,452,830
Patented July 1, 1969

3,452,830
DRIVING SYSTEMS
George J. Gendron, Oradell, N.J., Kenneth D. Garnjost, Buffalo, N.Y., and Alfred J. Mastropole, Allendale, N.J., assignors, by direct and mesne assignments, to Raymond International, Inc., New York, N.Y., a corporation of New Jersey
Filed Dec. 5, 1966, Ser. No. 599,098
Int. Cl. E21c 3/02, 3/08, 3/20
U.S. Cl. 175—55                                       32 Claims

ABSTRACT OF THE DISCLOSURE

Vibratory driving arrangements for piles and the like using phase shift control between the vibratory driver and the pile, and using a bias weight with the vibratory driver interposed between the weight and the pile. Also, a hydraulic vibrator construction and coupling arrangement, and electrical means for controlling the vibrator.

---

This invention relates to driver systems and more particularly it concerns improvements to the driving of piles and the like. While the invention is specifically described in connection with the driving of piles, its applicability to the driving of caissons, rock drills etc. will be readily apparent to those skilled in the art.

It has been known for some time that mechanical vibrations could be employed to improve the speed and efficiency of pile driving operations. In general, vibratory pile driving techniques involved the provision of a vibratory pile driving techniques involved the provision of a vibratory driver at the top of the pile, and the pile was used as an acoustic transmission line through which these vibrations were passed to its lower end. The lower end of the pile would then act as a high speed battering ram and would force itself down into the earth.

Past vibratory pile driving systems have utilized pairs of eccentric weights arranged for counter rotation about axles fixed to the top of the pile. The centrifugal forces developed by the weights neutralized each other in a lateral direction but supplemented each other in a longitudinal direction so that there was produced a longitudinal vibratory action at the top of the pile. This arrangement, while ensuring complete energy transfer from the weights to the pile, nevertheless, lacked flexibility of control. The reason for this is that the amount of force produced by the weights was proportional to the square of their angular velocity or frequency. In order to adjust the generated force independently of frequency, the mass of the weights or their radius arm had to be changed. The eccentric weight method also suffered from a practical limitation on the amount of force which could be produced. Further, these devices were subject to excessive bearing wear and related mechanical failures.

It has also been proposed to move a weight up and down on top of a pile by fluid means in order to develop the necessary vibratory forces. This technique provides flexibility of operation in that it permits frequency and force to be adjusted independently of each other. However, there are certain other problems which arise in connection with the use of fluid drive devices. The first of these involves power losses which result from the flow of actuating fluid through the relatively restricted passages of the valves and lines in the system. The second problem is related to the first and involves the phase variations in pressure and therefore of applied force due to this fluid flow. In a hydraulic piston type vibrator, fluid forces act upon the piston to move it and the tip of the pile up and down. The pile however, due to its own elastic qualities, and to the ground reaction, acts back through the piston to the hydraulic fluid in such a manner that the phase relationship between the fluid flow and the fluid pressure in the system are changed. As a result, conditions arise wherein power is wasted due to the production of large fluid flows which are unresisted by piston reaction.

The present invention overcomes all of the above problems. According to this invention there is provided a novel pile driving arrangement characterized by flexibility and ease of control and yet is matched to the pile in a manner such that a considerably greater portion of the energy supplied to the device finds its way into the pile.

The pile driving arrangement of the present invention utilizes a hydraulic drive. The amount of fluid which flows through this drive however is minimized by means of novel arrangements hereinafter described.

According to one aspect of the present invention, there is mounted on top of a pile, a massive bias weight whose characteristics of mass and resiliency are essentially lumped or concentrated in a minimum volume. The bias weight is supported on the pile by means of a hydraulic piston and cylinder assembly which forms the actuator part of a hydraulic vibrator. The vibrator is caused to operate at a frequency at which the pile begins to exhibit wave propagation characteristics due to its distributed mass and resiliency. As the frequency is thus increased, the impedance exhibited by the mass of the bias weight increases while that exhibited by the pile decreases. As a result, the bias weight does not move appreciably in a vibratory manner so that almost all of the displacement of the hydraulic piston is available to move the top of the pile. Thus, for a given amount of pile vibratory amplitude, the actuator displacement and valve flow are minimized.

The valve flow is further minimized by providing a phase control in such a manner that the fluid pressure and the valve flow are in phase at the valve. In other words, as fluid flows through the valve, it encounters a reactive pressure which is always proportional to its flow so that maximum work will be achieved for a minimum of fluid flow through the valve.

This phase control is achieved by providing a special mechanical reactance between the top of the pile and the driver energy source. The reactance is made up of mass and spring elements whose valves are controlled in such a manner that even though the force and displacement at the top of the pile are not in phase, the phase shift produced in the reactance will bring them into phase at the valve. The mass element in the illustrated embodiment is provided as the driver attachment collar to the pile, while the spring element is provided as the compliance of the hydraulic fluid. Either or both of these may, of course, be varied to compensate for different conditions encountered in the driving of a pile, and in the driving of different piles.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings forming a part of the speification, wherein:

FIG. 1 is a side elevational view showing a portion of a derrick arrangement for a pile driving system according to the present invention;

FIGS. 2 and 3 are side and front elevational views, respectively, of the drive assembly portion of the arrangement of FIG. 1;

FIG. 4 is an exploded perspective view showing the arrangement of major parts making up the drive assembly of FIGS. 2 and 3;

FIG. 5 is an enlarged elevational section view of the drive assembly portion of FIGS. 2 and 3;

FIG. 6 is a fragmentary section view taken along line 6—6 of FIG. 2;

FIG. 7 is a section view taken along line 7—7 of FIG. 6;

FIG. 9 is a view taken along line 9—9 of FIG. 7;

FIG. 11 is a view taken along line 11—11 of FIG. 7 with the end cap removed;

FIG. 12 is a view taken along line 12—12 of FIG. 11;

FIG. 13 is a view taken along line 13—13 of FIG. 11;

FIG. 14 is a view taken along line 14—14 of FIG. 5;

FIG. 15 is a half section view taken along line 15—15 of FIG. 5; and

FIG. 16 is a schematic diagram illustrating the control arrangement for the present invention.

Figure 10:
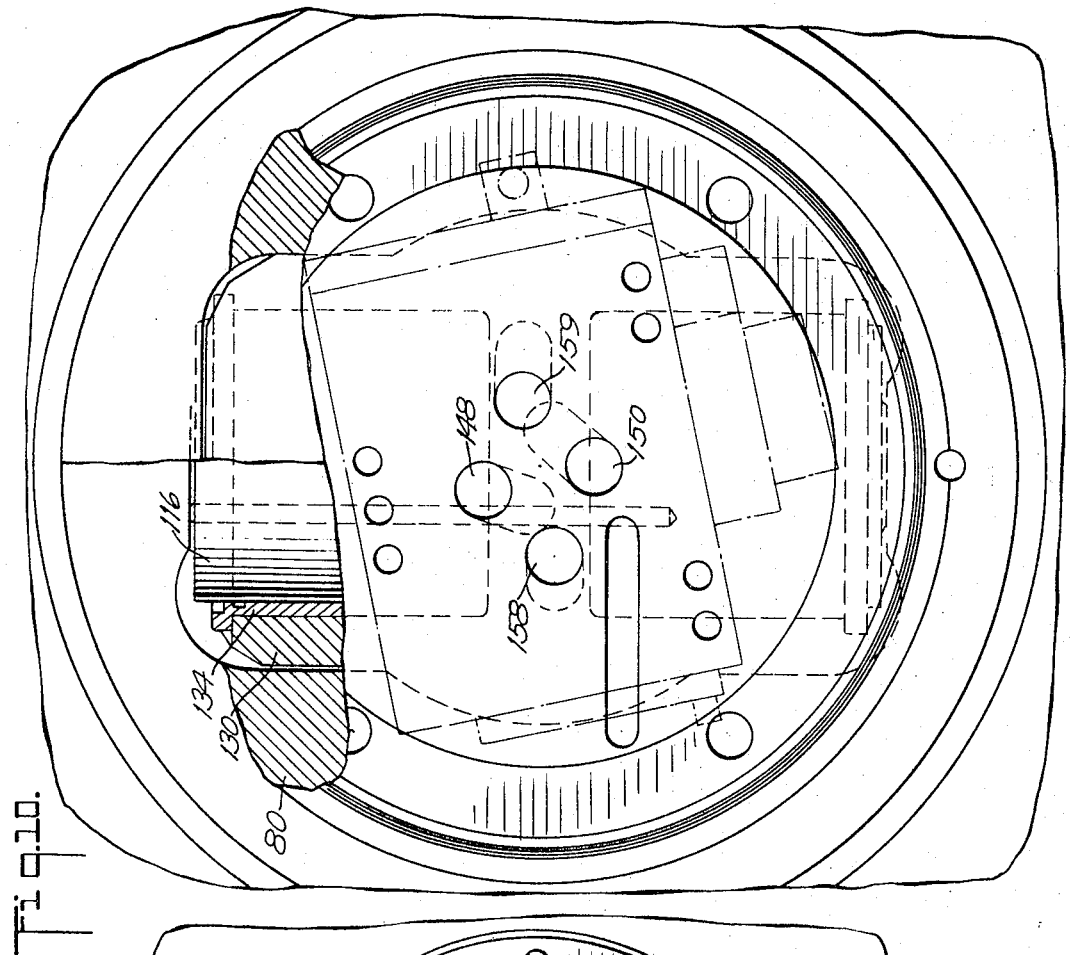
FIG. 10 is a view taken along line 10—10 of FIG. 7.

The derrick arrangement illustrated in FIG. 1 is similar to that shown and described in U.S. patent application Ser. No. 401,365 in the name of Stanley C. Haug and assigned to the assignee of the present invention. This derrick arrangement includes a chassis 20 which is driven along the ground on crawler tracks 22. A turntable 24 is mounted on the chassis 20 and is rotatable by means of a turntable drive assembly shown generally at 26. A back frame 28 and a front frame 30 extend upwardly from the turntable 24 in parallel relationship to each other. A top frame 32 is pivotally connected to the upper ends of the back and front frames 28 and 30, and maintains their parallel relationship. The frames 28 and 30 are pivotally movable on the turntable 24 by means of a spotting cylinder 36, which extend diagonally across the parallelogram formed by the back frame 28, the top frame 32, the front frame 30 and the turntable 24.

A leader assembly 38, made up of four elongated vertical bars 40, is attached to the upper end of the front frame 30. The vertical bars 40 are maintained in parallel relationship by means of diagonally extending spacer bars 42. A horizontally extending head frame 44 is mounted across the top of the leader assembly 38 and pivots thereon about a horizontal axis 46 under the influence of a batter cylinder 48 which extends from the top of the back frame 28 to the back portion of the head frame 44. A hammer line 50 extends from a winch (not shown) on the derrick up under a first pulley 52 at the top of the back frame 28 and up to a rear head frame pulley 54 near the back of the head frame 44. The hammer line 50 then proceeds to an upper sheave 56 at the front of the head frame 44 and down around a lower sheave 58 on a driver assembly 60 to be described more fully hereinafter.

A pair of vertical guide rails 62 are secured to the leader assembly 38 and serve to guide the driver assembly 60 for vertical movements during the driving of a pile. A pile assembly 64, comprising a series of interconnected pile elements 64a, is attached at its upper end to the lower end of the driver assembly 60. The lower end of the pile assembly 64 is also guided during driving thereof by means of a bottom pile guide 68 which extends outwardly from the lower end of the leader assembly 38.

A hydraulic pump 70 is located either on or near the derrick and is driven by suitable power means (not shown). An hydraulic circuit is also supplied. This hydraulic circuit includes a pair of hydraulic pressure and drain lines 71 and 72 which extend respectively from the pump 70 and a reservoir 73 to the drive assembly 60. Electrical lines 74 also extend between an electrical control network, to be described hereinafter, and the driver assembly 60.

A sink rate cable 75 is connected at its opposite ends to the top and bottom, respectively, of the driver assembly 60. The cable 75 is also looped over upper and lower sink rate cable pulleys 76 and 77. A sink rate meter 78, including tachometer means arranged to measure rotational speed of the lower pulley 77, is also provided to give an indication of the rate of lowering of the driver assembly 60, and consequently of the drive or sink rate of the pile assembly 64.

FIGS. 2 and 3 show the outer configuration of the driver assembly 60. As shown in FIG. 2, the upper and lower ram blocks 80 and 82 are bolted together by means of a plurality of elongated tension bolts 84. A sheave block 86 is bolted to the top of the upper ram block 80 and mounts the lower sheave 58 for rotation thereon. The hammer line 50 passes around the sheave 58 and is used to lift the driver assembly 60 up and down as the pile assembly 64 is being driven into the earth.

The upper and lower ram blocks 80 and 82 are bored out to form a common vertical bore 88 (shown in dotted outline) into which a quill member 90 extends. The quill member 90 is connected by means of a coupler assembly 92 to the top of the pile assembly 64. An oscillator assembly 96 extends crossways through the upper ram block 80 and engages the quill member 90 near its upper end to effect longitudinal movement of the quill member.

As the pile assembly 64 is driven downwardly into the earth, the driver assembly 60 follows the pile assembly 64 downwardly. In order to maintain proper direction and alignment during this movement, the upper and lower ram blocks 80 and 82 are provided with external grooves 98 which accommodate the guide rails 62 which are supported upon the leader assembly 38 of the derrick.

The shape and interconnection of the various members constituting the driver assembly 60 are best visualized in the exploded perspective view of FIG. 4. Here, both the upper and lower ram blocks 80 and 82 are seen to be provided with a plurality of vertical bores 102, through which the various tension bolts 84 extend. These vertical bores 102 surround the aligned vertical bores 88 which accommodates the quill member 90. The upper ram block 80 is additionally provided with smaller and larger cross bores 104 and 106 which extend radially outwardly, respectively in opposite directions from the common vertical bore 88. The oscillator assembly 96 fits into the upper ram block 80 through the smaller and larger cross bores 104 and 106. The oscillator assembly 96, as shown in FIG. 4, consists of the three distinct regions, identified respectively as the power and control input region 108, the drive region 110, and the valve and accumulator region 112. The power and control input region 108 fits closely into the smaller cross bore 104 while the valve and accumulator region 112 fits closely into the larger bore 106. This leaves the drive region 110 extending across the central bore 88 of the upper ram block 80. In this position, the drive region 110 extends through a rectangular slot 114 which is formed in the quill member 90.

The oscillator assembly 96 is provided with upper and lower drive pistons 116 and 117 in its drive region 110. As will be described more fully hereinafter, these drive pistons 116 and 117 move up and down with respect to the oscillator assembly 96 and engage the upper and lower ends of the rectangular slot 114 in the quill member 90 causing the quill member to move up and down with respect to the oscillator assembly 96. Because of the interconnection between the oscillator assembly 96 and the upper and lower ram blocks 80 and 82, the quill member 90 moves up and down with respect to the entire driver assembly 60.

Also, as shown in FIG. 4, the coupler assembly 92 fits up into the bottom of the quill member 90 and is bolted thereto by means of cooperating bolt flanges 118 and 120 on the quill member and the coupler assembly respectively.

The sheave block 86, as stated previously, is bolted to the top of the upper ram block 80.

Turning now to FIG. 5, it will be seen that when the oscillator assembly 96 and the quill member 90 are in place, the quill member 90 may move up and down within the central bore 88 under the influence of the up and down movement of the upper and lower drive pistons 116 and 117 in the driver region 110 of the oscillator assembly 96. The oscillator assembly 96 is secured within the upper ram block 80 by means of a plurality of tightening bolts 122 which extend into the upper ram block and engage a tapered ring 124 on the power and control input region 108 of the oscillator assembly 96. A similar tapered ring 126 on the valve and accumulator region 112 is also pulled into tight fitting relationship with the upper ram block 80 on the opposite side of its central bore 88. This arrangement insures a secure and very rigid assembly whereby the actuator unit 96 is effectively an integral part of the upper and lower ram block 80 and 82.

Turning now to FIGS. 6 and 7, it will be seen that the oscillator assembly 96 is made up of a heavy casting 130 shaped such that its different regions fit into corresponding openings in the upper ram block 80. Thus the forward end or power and control input region 108 of the casting 130 fits into the smaller cross bore 104 while the driver region 110 fits into the common vertical bore 88 and the valve and accumulator region 112 fit into the larger cross bore 106. Upper and lower aligned piston bores 132 and 133 are provided in the driver region 110 of the casting 130 and sleeves 134 are fitted into these bores to accommodate the upper and lower drive pistons 116 and 117 respectively, in close fitting relationship.

The casting 130 terminates deep within the larger cross bore 106 and the accumulator region is made up of a plurality of hydraulic components (shown in dotted outline), mounted on the end of the casting 130 and covered by an outer shell 144 and an end cap 146. The arrangement and operation of these hydraulic components will be described more fully hereinafter.

Figure 8:
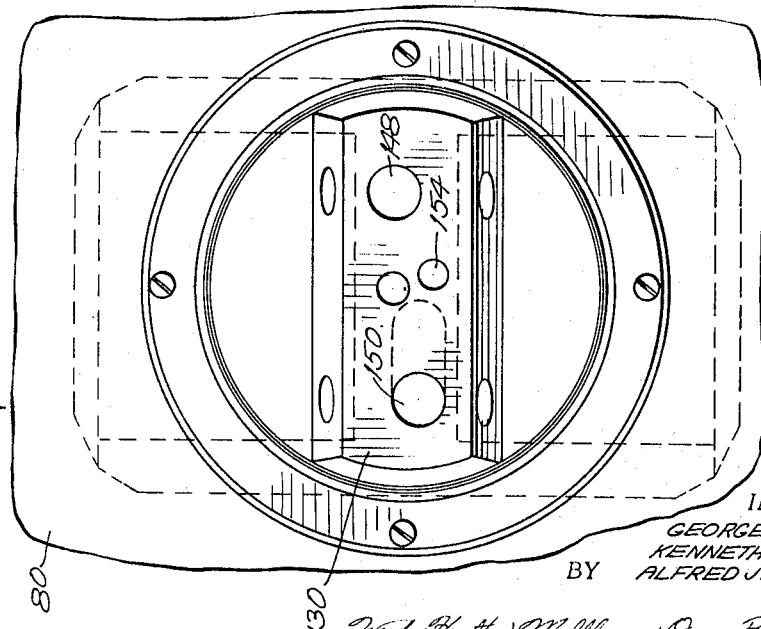
FIG. 8 is a view taken along line 8—8 of FIG. 7.

As shown in FIGS. 6, 7 and 8, the casting 130 is bored longitudinally to form a pressure conduit 148 and a drain conduit 150. These conduits communicate with hydraulic fittings 152 at the exposed end of the power and control input region 108 of the casting; and through the fittings these conduits are connected respectively to the hydraulic pressure and drain lines 71 and 72. As shown in FIG. 7, there is additionally provided an electrical cable conduit 154 which extends through the length of the casting 130 and which communicates between an electrical input fitting 156 at the exposed end of the power and control input region 108 and the valve and accumulator region 112. A pair of piston supply conduits 158 and 159 also extend through the casting 130 from the accumulator region 112 to associated piston bores 132 and 133. The arrangement of these various conduits in the central region of the casting 130, and their relation to the piston bores 132 is illustrated in FIG. 9.

As shown in FIGS. 7 and 10, the pressure conduit 148 and the drain conduit 150 are angled within the casting 130 to terminate one above the other in the valve and accumulator region 112. At the same time, the piston supply conduits 158 and 159 are arranged to terminate one alongside the other in the valve and accumulator region 112.

Within the valve and accumulator region 112 there is provided a main valve block 160 which is bolted to the casting 130. The valve block 160 contains various internal passageways which communicate with the pressure and drain conduits 148 and 150, and with the piston supply conduits 158 and 159 in the casting 130. More particularly, as shown in FIG. 11, there is provided a drain conduit passageway 162 which communicates with the drain conduit 150 when the valve block 160 is bolted in place. There is also provided a main valve bore 164 (shown in dotted outline) which extends generally parallel to the drain conduit passageway 162. A main valve spool 165, shown in FIG. 12, fits closely within the main valve bore 164 but is movable longitudinally therein to direct the flow of fluid in a manner to be explained more fully hereinafter.

The main valve bore 164 as shown in FIG. 12, is formed with four axially displaced radially enlarged regions 166–169. The outer enlarged regions 166 and 169 communicate via passageways 166a and 169a, to the drain conduit passageway 162 and thence to the drain conduit 150 in the casting 130. The central enlarged regions 167 and 168, on the other hand, communicate directly with the pressure conduit 148 in the casting 130. Between the central and outer enlarged regions 166–169, there are provided two intermediate regions 170 and 171 which themselves are radially enlarged. As shown in FIG. 13, these intermediate regions are each connected via an adjustable length passageway 172, to a corresponding one of the piston supply conduits 158 and 159.

The main valve spool 165 is provided with a central land 173 and two outer lands 174 axially displaced from the central land by reduced diameter portions 175. The lands 173 and 174 fit closely in the main valve bore 164 and are of such length that when the main valve spool 165 is in an intermediate position as shown in FIG. 12, fluid cannot flow out from the pressure connected central enlarged regions 167 and 168, nor can fluid flow into the drain connected outer enlarged regions 166 and 169. When the spool 165 moves to the left however, the pressure connected central enlarged regions 167 and 168 are placed into communication with the right hand intermediate region 171 while the left hand drain connected outer enlarged region 166 is placed into communication with the left hand intermediate region 170. This allows high pressure fluid to flow in from the pressure conduit 148, through the central enlarged regions 168 and 169, past the central land 173 and through the right hand intermediate region 171, the associated adjustable length passageway 172, and the associated piston supply conduit 158 to the upper piston bore 132 to cause the upper piston 116 to extend or protract upwardly. At the same time, the lower piston 117 retracts and also moves upwardly, the fluid displacement being accommodated by a flow out through the piston supply conduit 159, the associated adjustable length passageway 172, the right hand intermediate region 171 of the main valve bore 164, past the outer valve spool land 174, and into the left hand enlarged region 166. From there fluid flows freely through the passageway 166a to the drain conduit passageway 162 and out the drain conduit 150 and the drain line 72 to the reservoir 73.

When the main valve spool 165 is shifted to the right, the pressure connected central enlarged regions 167 and 168 are placed in communication with the left hand piston connected intermediate region 170 while the right hand drain connected outer enlarged region 169 is placed in communication with the right hand piston connected intermediate region 171. This produces a reverse flow of fluid, causing the upper piston 116 to retract and the lower piston 117 to protract, both pistons moving downwardly with respect to the driver assembly. It will thus be appreciated that by switching the spool 165 between its left and right hand positions the driver pistons 116 and 117 are moved in and out so that the quill member 90 and the pile assembly 64 are driven up and down with respect to the driver assembly 60. Further, by shifting the spool position at a rapid rate the quill member 90 and the top of the pile assembly 64 can be vibrated longitudinally at the same rate.

The construction of the two adjustable length passageways 172 is best shown in FIGS. 9, 11 and 13. These passageways are each formed by a U-shaped tubular piece 177, the two legs of which fit over and telescope with two stationary tubular elements 178 and 179. These stationary elements are connected respectively to one of the two intermediate regions 170 and 171 and to one of the two piston supply conduits 158 and 159. The two U-shaped pieces are connected by a cross beam 180 so that they move up and down in unison. An adjusting bolt 181 is threaded through the cross beam 180 and secured at its lower end to rotate against the surface of the valve block 160. By turning the adjusting bolt 181 the cross beam 180, and hence the two U-shaped pieces 182, are made to move up and down. This produces a trombone effect and thereby permits adjustment of the hydraulic volume between the main valve spool 165 and the drive pistons 116 and 117. The purpose for this adjustment will be explained more fully hereinafter.

As shown in FIG. 11, an oil filter 183 is mounted on the outer side of the main valve block 160, and communicates with the oil flowing between the drain conduit 150 and the pressure connected central enlarged regions 167 and 168 of the main valve bore 164. This filter serves as a final oil cleaner immediately ahead of the main valve to intercept any foreign particles which might otherwise damage the main valve spool 164.

A larger pressure accumulator 184 is also mounted on the outer side of the main valve block 160; and as shown in FIG. 12, it is also in communication with the pressure connected central enlarged regions 167 and 168. A pair of smaller accumulators 185 and 186 are similarly mounted on the main valve block 160 and are placed in communication with the drain connected outer enlarged regions 166 and 169 via the drain conduit passageway 162. The accumulators serve to isolate the transient effects which rapid movements of the valve spool 164 would otherwise impose upon the hydraulic fluid in the supply and drain lines.

A valve spool position transducer 188, well known in the art, is mounted on one edge of the main valve block 160. This spool position transducer contains a movable core element 190 connected to move with the main valve spool 165. The transducer is energized via an input plug 192; and electrical signals indicative of axial spool position are taken out via the same plug. The amplitude of these signals is compared with the input signal amplitude so that the position of the spool may be accurately maintained in accordance with the input signal.

The main valve spool 165 is moved axially by means of hydraulic pressure applied through pilot control passages 194 which open to each end of the spool. These passages communicate with pilot control stages 196 bolted to the main valve block 160. The pilot control stages are a series of electro-hydraulic transducers and hydraulic amplifiers, well known in the art, which operate in response to an applied electrical trigger signal, to switch supply and drain pressures upon hydraulic lines such as the pilot control passageways 194. Thus, whenever an electrical trigger signal is applied to the pilot control stages 196, they switch the application of pressure in the pilot control passageways 194; and this in turn is applied to the ends of the main valve spool 165 causing it to shift position. As stated, the pilot control stages are well known to the art. A typical example of such a device is the Moog Series 73 Industrial Servovalve made by Moog Servocontrols Inc., East Aurora, N.Y.

Reverting to FIG. 5, there is additionally provided a pile displacement transducer 200 connected between the lower ram block 82 and the pile coupler assembly 92. This transducer comprises a base member 202 which is bolted to the bottom of the quill member 90, and an upper guide member 204 which extends down from and its secured to the lower ram block 82 by means of a setscrew arrangement 206. An elongated probe element 208 extends up from the base member 202 and into the upper guide member 204. As the pile moves with respect to the ram blocks 80 and 82, the probe element 208 moves up and down inside the upper guide member 204. A position sensing element 210, such as an electrical transformer, is mounted within the upper guide member 204 and responds to movements of the probe element by producing electrical output signals corresponding to its displacement. The pile displacement transducer 200 thus indicates the amplitude of stroke, or movement of pistons and pile assembly with respect to the driver assembly 60.

The driver assembly 60, as stated previously, is attached to the top of the pile assembly 64 by means of a coupler assembly 92. This coupling assembly, which is shown in detail in FIGS. 5, 14 and 15, comprises a clamp housing 212 having a flanged portion 120 which is bolted to a corresponding lower flanged formation 118 on the bottom of the quill member 90. The clamp housing 212 is hollow and toward its upper portion is formed an hydraulic cylinder 214. A clamping piston 216 fits closely within the cylinder 214 and is connected at its lower end to a piston rod 218, which in turn is attached to a tapered wedge block 220. An inner cup member 222 is threaded into the inside of the clamp housing 212 and its upper end forms the lower end of the hydraulic cylinder 214. The inner cup member 222 is formed with an opening at its upper end for the piston rod 218; and sealing means 224 are provided to prevent leakage around the rod. The lower portion of the inner cup member 222 is formed with an enlarged internal diameter 226, and, as shown in FIG. 14, there are provided a plurality of clamp shoe openings 228 extending radially through the lower walls of the inner cup member. A like number of clamp shoes 230 extend through and are guided for radial movement by the openings 228. The inner surfaces of these clamp shoes 230 are tapered to conform to the outer surface of the wedge block 220 and the clamp shoes are thus caused to move radially outward by the wedge block whenever the wedge block moves in an upward direction. The outer surfaces of the clamp shoes 230 are serrated as at 232, and when the wedge block 220 is moved upwardly the clamp shoes 230 press against and dig into the inner surface of the uppermost pile element 64a urging it out against the inner surface of the clamp housing 212. In this manner a very rigid and secure, yet easily detachable coupling is achieved between the driver assembly 60 and the pile assembly 64. This coupling moreover effectively transmits the vibratory energy of the driver assembly with a minimum of loss and/or reflection of vibratory energy.

The hydraulic cylinder 214 within the coupling assembly 92 is connected, on opposite sides of the piston 216, to hydraulic connectors 234. By controlling the application of pressure to these connectors, the longitudinal movements of the piston 216 and hence the action of the wedge block 220 can be easily controlled. By virtue of this arrangement only simple hydraulic connection need be made to rigidly clamp the driver and pile assemblies.

In order to prevent the clamp shoes 230 from adhering to the pile element 64a after the wedge block 220 is moved downwardly, there is provided a retraction plate 236 on the piston rod 218 (FIG. 15). This retraction plate is formed with depending flanges 238 of wedge shaped cross section. The flanges 238 engage corresponding grooves 240 in the upper surface of each of the clamp shoes 230 and upon moving downwardly into this groove, it urges the clamp shoes back to a retracted position. Thus complete control of both the clamping and unclamping action of the coupling assembly 92 may be achieved by means of hydraulic control only.

The overall system is controlled by the control arrangement illustrated schematically in FIG. 16. Basically, this control arrangement operates to produce voltage pulses of controllable frequency and amplitude; and to apply these voltage pulses to the pilot control stages 196. The pilot control stages in turn operate to shift the main valve spool 165 back and forth at the same frequencies and to positions corresponding to the pulse amplitudes. The back and forth movement of the main valve spool acts to open and close hydraulic passageways which direct hydraulic fluid into and out from the piston bores 132 and 133 in alternate sequence. This causes the drive pistons 116 and 117 to protract and retract in similar alternate sequence thus pushing the quill member 90 and the top of the pile assembly 64 up and down at the same frequency and at a corresponding amplitude.

The control arrangement includes a conventional ramp generator 250, which produces a continuous series of slowly rising and rapidly falling output voltages according to a sawtooth wave form. The frequency of these sawtooth voltages is readily controlled in well known manner by adjustment of the ramp generator. The sawtooth voltages are then amplified in a D.C. amplifier 252 and are applied to a Schmitt trigger circuit 254. The Schmitt trigger circuit operates to generate a series of square wave voltages at the same frequency as the frequency of the applied sawtooth voltages. Samples of the various sawtooth and other waveforms indicating voltages, valve spool position, and quill member displacement are shown at appropriate locations on the diagram.

The voltages produced in the Schmitt trigger circuit 252 are then passed through an amplitude control circuit 256. This circuit is in effect a variable resistor or potentiometer; and it serves to provide amplitude control for the system. The amplitude controlled voltages are then amplified in a further amplifier 258 and applied to the pilot control stages 196 of the servovalve system.

In the pilot control stages, the applied square wave voltages are converted to corresponding hydraulic forces which serve to shift the position of the main valve spool 165. The position to which the spool 165 moves each time the applied voltage changes, is governed by the amplitude of the applied voltage. This amplitude is compared at a terminal 187 with the voltage output from the spool position transducer 188. As the valve spool 165 moves in response to pilot pressure supplied by the pilot control stages 196, the voltage produced by the spool position transducer 188 changes, until it reaches an amplitude equal to the voltage amplitude set by the control circuit 256. At this point the two voltages cancel each other so that the signal applied to the pilot control stages 196 is reduced to zero and the pilot control stages cease to produce further movement of the main valve spool 165. Actually this all takes place nearly instantaneously, preferably in the neighborhood of about two milliseconds.

The switching of the valve spool position as above described results in a switching of the application of hydraulic pressure from one driver piston to the other. Accordingly, hydraulic fluid will flow out from one piston bore to drain while its piston retracts while high pressure fluid flows into the other piston bore causing its piston to project. This produces a relative movement between the oscillator assembly 96 and the quill member 92.

The movements produced between the oscillator assembly 96 and the quill member 90 are detected by the pile displacement transducer 200; and the electrical signals representing these displacements are passed through a low pass filter 260 and combined with both the output of the ramp generator 250 and the input to the trigger amplifier 258.

The low pass filter 260 is set to pass only those signals representing variations in pile-to-driver displacements which occur below the vibrational frequency of the system. The purpose for this, as will be explained, is to indicate the average position of the casting 130 inside the slot 114 and to produce corrective action whenever this average position approaches either the top or the bottom of the slot.

The hydraulic circuit which powers the system is also shown schematically in FIG. 16. This circuit, of course, includes the pump 70 and reservoir 73 along with hydraulic pressure and drain lines 71 and 72 leading from these elements to the pressure and drain conduits 148 and 150 inside the casting 130 of the driver assembly 60.

The pump 70 is of the positive displacement type and has automatic flow control means responsive to pressure variations in the system. As shown, the pump includes a rotatable body portion 270 which is rotated about its longitudinal axis by means of a drive motor 271. The body portion 270 is formed with a plurality of piston bores into which pump pistons 272 extend. A cam plate 273 and a swash plate 274 are mounted for pivotal movement about an axis 275 at one end of the body portion. The pump pistons 272 are urged against the cam plate 273 by internal spring means (not shown) inside the body portion 270. Depending upon the angle at which the cam plate 273 is set, the pistons 271 undergo a longer or shorter stroke up and down inside the body portion as they are carried around by it. A stationary valve plate 276 is mounted at the other end of the body portion, and is formed with valves and internal porting which serves to direct fluid from the reservoir 73 up into the pressure line 71 as the pump pistons 271 reciprocate inside the body portion.

Bias means, such as a spring 277, is connected to the swash plate 274 and tends to tilt both the swash plate and the cam plate to a position at which the pump pistons 271 will undergo maximum stroke and therefor maximum flow output. An hydraulically actuated control arrangement, shown schematically as a piston and cylinder assembly 278 and a biased check valve 279, is provided to counter the effects of the bias spring 277 and pull the swash plate and cam plate to a position of lesser flow output. The swash plate 274 has an expansive surface and is mounted to move in an oil bath. The oil bath produces a viscous damping effect so that the regulatory action of the swash plate and cam plate is kept smooth.

When the pump 70 begins operation it initially produces maximum flow output. However, when the output pressure exceeds a given value, such as 5,000 p.s.i., then this pressure, applied through a feedback line 280 to the check valve 289, overcomes the valve bias and allows fluid to flow into the piston and cylinder assembly 278 which in turn moves the swash plate 274 and cam plate 273 toward a position where less flow output is produced at the 5,000 p.s.i. pressure.

A mechanical linkage arrangement 282 is connected to the cam plate axis 275 and transmits cam plate tilt to a flow indicator 284. This flow indicator thus indicates the volume of hydraulic fluid being used by the system at the 5,000 p.s.i. pressure; and this in turn represents the total power being used by the system.

At the same time the sink rate pulley 77 is rotated by the action thereon of the sink rate cable 75 as the drive assembly 60 and pile assembly 64 move downwardly. This pulley rotation is used to turn a tachometer 286 whose electrical output is monitored by a sink rate meter 288. The sink rate meter thus indicates the rate at which the pile assembly is being driven into the ground.

It will be appreciated that with the indications produced by the above described flow indicator and sink rate meter, a continuous comparison can be made of the rate at which the pile assembly is being driven, and the power being used to drive it at that rate.

During operation of the device hydraulic pressure from the pump 70 is supplied via the line 71 through a fitting 152 and the pressure conduit 148 to the central enlarged regions 167 and 168 of the main valve block 160. At the same time, drain pressure from the reservoir 73 is communicated via the line 72 through a similar fitting 152 and the drain conduit 150 to the outer enlarged regions 166 and 169. As the main valve spool 165 is switched between left hand and right hand positions, the pressure and drain lines 71 and 72 are connected alternately between the upper and lower piston bores 132 and 133 in the oscillator assembly causing the driver pistons 116 and 117 to project and retract in alternate sequence as above described. The driver pistons bear continually against the upper and lower surfaces defined by the slot 114 in the quill member 90 and their in and out movements serve to produce a positive up and down relative displacement between the quill member 90 and the casting 130. Since the casting 130 is tightly connected to the ram blocks 80 and 82 of the driver assembly 60, and since the quill member 90 is tightly connected to the upper end of the pile assembly 64, the relative displacement actually takes place between the ram block weighted driver assembly 60 and the upper end of the pile assembly 64.

It will be noted that the pile assembly is elongated, and therefore at higher vibratory frequencies its distributed mass and resiliency begin to exhibit vibratory wave propagation properties. Because of this, the impedance or resistance to vibratory motion at the top of the pile decreases at higher vibratory frequencies. On the other hand, the mass of the driver assembly 60, including the ram blocks 80 and 82, is effectively concentrated at all frequencies, and thus its impedance or resistance to vibratory movements actually increases at higher vibratory frequencies. As a result, as the drive pistons move back and forth at higher frequencies, the power used to produce relative displacement between the pile and the driver is directed more and more in the pile, thus producing vibratory movement of the pile. At the same time, the massive driver remains substantially free from vibratory motion. In fact, in an actual installation wherein the top of the pile was vibrated through a stroke of close to one half inch at about 80 cycles per second, no detectable vibration could be felt by placing one's hand on the driver. It will be noted that while the vibratory motion is initiated between the massive driver assembly and the pile, the pile remains subject to the continuous downward bias force exerted by the weight of the driver assembly. This combination of a continus downward bias force and a superimposed vibratory force provides a very desirable driving arrangement. The combination of these two types of forces is effectively achieved by using a bias weight which is so large as not to be significantly displaceable by vibratory forces, and then by inserting the vibratory forces into the system at a point between the bias weight (i.e., the massive driver assembly) and the top of the pile assembly. In prior systems where the vibratory forces were added to the top of a bias weight the bias weight had to be limited to a value where it could move along with, and therefore transmit, the vibratory forces to the pile. The present system overcomes this problem with a simple structure and without need for damping or cushioning elements of the prior art which consume power without doing useful work.

Because the massive driver assembly does not vibrate to any significant extent at the frequencies employed, practically the entire displacement of the driver pistons is available to displace the upper end of the pile. This in turn serves to minimize the piston stroke necessary for a given vibratory amplitude, and accordingly, it minimizes the amount of fluid flow through the valve arrangement needed to vibrate the upper end of the pile.

The minimization of valve flow has also been achieved, according to the present invention, by interposing a mechanical reactance between the top of the pile and the driving energy source. This reactance includes the mass of the quill member 90 and its associated coupler assembly 92 as well as the springiness or compliance of the hydraulic fluid between the valve 165 and the pistons 116 and 117. Under the various driving conditions encountered, the forces produced at the upper end of the pile do not vary in phase with the associated displacements at the top of the pile. That is, the pile is not being driven at resonance. Now from the standpoint of most efficiently getting vibratory energy into a pile, it would be preferable to vibrate the pile at its resonant frequency. This is because at the resonant frequency, the force and displacement at the upper end of the pile are in phase, and the maximum amount of work is produced on the pile for a given amount of movement of the upper end of the pile. On the other hand, it has been found to be neither practical nor desirable to vibratorily drive a pile at pile resonant frequencies. In fact, studies have shown that under normal conditions a pile can be driven significantly faster when it is vibrated at a frequency substantially above its resonant frequency.

When a pile is driven hydraulically at these higher frequencies however, the phase relationship between the forces and displacements at the upper end of the pile is shifted. As a result during certain portions of each driving cycle, greater amounts of fluid are demanded with little reaction being produced and therefore little energy transfer into the pile, while during other portions of the driving cycle the back reaction force of the pile exceeds the applied force and large amounts of fluid are exhausted without having done work on the system.

The mechanical reactance provided by the small but finite elasticity of the hydraulic fluid between the valve and the driver system together with the mass of the quill member 90 and its associated coupler assembly 92 serves to adjust this phase relationship so that at the valve itself, the variation in system reaction force will occur in phase with the fluid flow through the valve. Thus a maximum amount of energy will be transferred into the system for a given flow of fluid through the valve.

It will be appreciated that various driving conditions will require different amounts of reactive phase shift to minimize valve flow. For example different ground conditions, different piles and even the different depths to which a given pile has attained will affect the phase relationships between force and displacement at the top of the pile. Because of this, it is desirable to adjust the interposed mechanical reactance. Such adjustment may be provided either by changing the amount or density of the mass making up the quill 90 and the coupler assembly 92. On the other hand, the reactive adjustment may be made by changing either the total volume or the specific compliance of the hydraulic fluid. The illustrated embodiment shows, in more or less schematic fashion, the use of trombone like variable volume passages 172 to achieve this result. By turning the adjustment bolt 181, the effective volume between the valve spool 165 and the piston bores 132 and 133 can be varied to give optimum results for the particular frequency of vibration. In a particular test rig it was found that particularly satisfactory results could be obtained at a frequency of about 80 cycles per second, when using hydraulic fluid having a fluid spring constant of about $5 \times 10^6$ lb./in., and a driver weight of about 15,000 pounds.

It will, of course, be understood that other reactive devices such as mechanical springs etc. may be used in addition to or in place of the compliant fluid.

Because the pile assembly 64 is essentially an elastic body, it best transmits vibrations which are sinusoidal in character. The driver of the present invention produces such vibrations by causing the drive pistons 116 and 117 to move in sinusoidal fashion. It has been found however that valves need not open sinusoidally to achieve this sinusoidal vibration of the pile. Instead the valves can operate in an "on-off" manner and thus minimize losses which occur when fluid flows through partially open valves. The conversion from "on-off" operation to sinusoidal flow occurs as a result of the transient integrating characteristics of the system. Thus by moving the spool according to a slightly tapered square wave pattern, the valve will cause the hydraulic fluid to produce a sinusoidal movement of the drive pistons 116 and 117. The electrical signal fom the Schmitt trigger circuit 254 is essentially square wave in nature. This signal, when converted in the pilot control stages 196 to hydraulic impulses for actuating the main valve spool, becomes modified as a result of the slight losses produced in the pilot control stages. Accordingly, its pattern is that of a square wave having tapered sides. This pattern, when followed by the main valve spool, produces the sinusoidal movement of the driver pistons described above.

It will be appreciated that with the present system, the frequency of vibration is controlled by controlling the frequency output of the ramp generator 250. The amplitude of piston stroke on the other hand is controlled by adjustment of the amplitude control circuit 256 to vary the input signal amplitude. Thus with the present system, the frequency and amplitude of the pile vibrations can be independently and continuously adjusted to provide optimum pile driving efficiency as ground conditions change, as the pile length increases and as the pile goes deeper into the earth.

In order to ensure that neither of the drive pistons 116 and 117 retracts to a point where the quill member 90 becomes forced against an upper or lower surface of the driver region 110 of the oscillator assembly 96, there is provided a feedback signal from the pile displacement transducer 200. This feedback signal, which varies with the quill to driver displacements, passes through the low pass filter 260, where its high frequency components are rejected and only its average value is retained. This average value, which is proportional to the difference between the average quill position and the average oscillator position, is fed back, as shown in FIG. 16, to compensate the input signals so that the drive pistons are driven longer in one direction than in the other. This results in a repositioning of the oscillator and quill member average positions and prevents these elements from being forced and jammed against each other.

In driving piles there are a number of factors which affect overall optimum conditions; and these may be weighted according to the particular circumstances. For example, it may be desirable to drive at a maximum rate, irrespective of cost, efficiency or power consumption. On the other hand, it may be desired to drive at minimum power consumption. In general, speed of driving and power used are the two dominant criteria and optimum driving conditions' are considered to be a predefined relationship between these two factors. The power used by the system is proportional to the rate at which fluid at a given pressure flows past the main valve spool 165. This flow rate, as explained previously, is governed by the position of the swash plate 274 and cam plate 272 on the pump 70 and this position is indicated on the flow indicator 284. The drive or sink rate of the pile into the ground in turn, is indicated on the sink rate meter 284. By maintaining the frequency of vibration and the amplitude such that the flow indicator 284 and the pile sink rate meter 288 indicate within their predetermined values optimum driving may be consistently maintained.

The drive system of the present invention is especially efficient and versatile. Its efficiency is evidenced by the fact that very little heating takes place in any of its component parts. It may thus operate for great lengths of time without overheating. The versatility of the invention is seen in the fact that both frequency and amplitude of vibration are independently adjustable over a wide range. This is made practical through the provision of the independently controllable mechanical reactance which serves to ensure that even though frequency and driving conditions may change the available energy for driving the pile it is maximized at all times.

This versatility of adjustment, permits one to make greater use of the power and drive rate instrumentation associated with the equipment so that he can make immediate and precise adjustments even though ground conditions may vary suddenly during the driving of a pile.

The instrumentation and adjustment set up moreover, is readily adaptable to computerized programming whereby signals indicating pump flow rate and pile drive rate are processed and used to adjust vibratory frequency and amplitude without human intervention.

According to a preferred manner of operating the equipment, the frequency and amplitude of pile vibration are first adjusted to provide a maximum drive rate. Then, with the frequency maintained, the variable mechanical impedance is adjusted to obtain minimum valve flow for most efficient overall operation.

What is claimed and desired to be secured by Letters Patent is:

1. Apparatus for driving an elongated member from one end thereof, said apparatus comprising a bias weight having a substantially greater resistance to vibratory displacements than said one end of said elongated member, vibrator means interconnecting can bias weight and said one end of said elongated member, said vibrator means being operative to induce vibratory displacements between said bias weight and said one end of said elongated member, said vibrator means comprising a piston and cylinder assembly, switching valve means arranged to control the flow of fluid to said piston and cylinder assembly and means for controlling the hydraulic volume between said switching valve and the piston of said piston and cylinder assembly to minimize valve flow for a given piston displacement.

2. Apparatus as in claim 1 wherein said valve means is operative to provide independent control of vibratory force and of vibratory frequency.

3. Apparatus as in claim 1 wherein said vibrator means delivers vibratory forces in opposite longitudinal directions and, wherein said vibrator means is rigidly interconnected between said elongated elastic member and said weight to ensure positive vibratory displacement therebetween in both said opposite longitudinal directions.

4. Apparatus as in claim 3 wherein said elongated elastic member is a pile arrangement and wherein said vibrator means comprises a crossarm which extends through a slot near the upper end of said pile arrangement.

5. Apparatus as in claim 4 wherein said crossarm is rigidly connected to said bias weight.

6. Apparatus as in claim 1 and including an electrical signal generator operative to produce electrical triggering signals as controllable repetition rate and means arranged to effect switching of said valve means in response to said triggering signals.

7. Apparatus as in claim 6 further including position transducer means connected to produce electrical signals representative of the displacement between the upper end of said elongated elastic member and said bias weight, low pass filter means capable of averaging the variations in electrical signals at said given frequency and means including said low pass filter means connected to feed back signals from said displacement transducer to adjust the relative timing of said triggering signals for maintaining the upper end of said pile assembly close to a given average position with respect to said bias weights.

8. Apparatus for driving an elongated member from one end thereof, said apparatus comprising a bias weight having a substantially greater resistance to vibratory displacements than said one end of said elongated member, vibrator means interconnecting said bias weight and said one end of said elongated member and thereby supporting said bias weight, said vibrator means being operative to induce vibratory displacements between said bias weight and said one end of said elongated member, said bias weight being formed with a bore accommodating said one end of said elongated member, and vibrator means including a cross arm extending transversely across said bore and through a slot in said one end of said elongated member within said bore.

9. Apparatus as in claim 8 wherein said crossarm is formed with vertical piston bores and is provided with piston means therein which extend out therefrom and bear against the upper end lower ends of said slot, and internal hydraulic conduits for supplying fluid to said pistons.

10. Apparatus as in claim 9 wherein there are provided switching valve means mounted on one end of said crossarm and hydraulic conduits extending therethrough between said switching valve means and said piston bores.

11. Apparatus as in claim 10 further including hydraulic supply and drain conduits extending from said switching valve means and fittings mounted on opposite end of said crossarm.

12. Apparatus for driving an elongated member from one end thereof according to claim 8 wherein said cross arm is rigidly connected to said bias weight.

13. A method for driving elongated elastic members comprising the steps of supporting a large bias weight on the upper end of an elongated elastic member, applying longitudinal vibratory displacement forces between the bias weight and the member by operating a valve to control the pressure and direction of force to a hydraulic piston and cylinder assembly connected between said bias weight and said member, and at the same time adjusting the relationship between the moveable mass of said upper end of said elastic member and the total compliance of the fluid between said elongated member and said valve to minimize hydraulic fluid flow through said valve.

14. A method as in claim 13 wherein said vibratory displacement forces are applied by independently controlling the pressure and direction of force of hydraulic fluid to a hydraulic piston and cylinder assembly connected between said bias weight and said member.

15. A method as in claim 14 wherein the direction of force is controlled at a location remote from said hydraulic piston and cylinder assembly at a rate such that an impedance match is established between said location and said piston and cylinder assembly.

16. A method of driving elongated pile members into the earth comprising the steps of placing a pile upright with one end on the earth, introducing varying forces at the other end of said pile to produce displacements thereof, the rate of variation of said forces being within the range at which said pile behaves as a wave transmission medium, and during such driving, first adjusting the frequency of force variation to produce a maximum drive rate and thereafter adjusting the phase relationship between said forces and said displacements to maximize energy transfer into said other end of said pile.

17. A method as in claim 16 wherein said pile is driven by means of a mechanical vibrating means and said phase relationship is adjusted by varying the mechanical reactance between said vibrating means and said other end of said pile.

18. A method as in claim 16 wherein said pile is driven hydraulically through a finitely compliant liquid and said mechanical reactance is varied by changing the volume of said hydraulic fluid.

19. A driving system comprising a stationary frame formed with an opening therethrough in the direction of driving, a crossbeam securely mounted on said frame and extending across said opening, driver means mounted on said crossbeam and reciprocally displaceable therefrom in said direction, means arranged to supply driving power via said crossbeam to said driver means and a quill member extending through the opening in said stationary frame, said quill member having a transverse slot extending therethrough and accommodating said crossbeam with said driver means contacting the ends of said slot, whereby actuation of said driver means produces reciprocal driving of said quill member along said direction.

20. A driving system as in claim 19 wherein said stationary frame comprises a massive bias weight having a quill member accommodating opening extending therethrough.

21. A driving system as in claim 20 wherein said driver means comprises hydraulic piston means fitted into associated cylinder means formed in said crossbeam, said crossbeam being formed with internal hydraulic conduits extending therethrough from said cylinder means to a location outside said stationary frame.

22. A driving system as in claim 21 wherein said driver means also includes hydraulic switching valve means mounted on said crossbeam.

23. A driver system comprising a massive bias weight formed with two openings each extending therethrough and intersecting at right angles within said bias weight, a quill member extending through one of said openings, said quill member being formed with a slot therethrough forming a continuation of the other opening in said bias weight, a crossbeam member extending through said other opening and through said slot, and driver means on said crossbeam member for contacting said quill member at the ends of said slot and for effecting reciprocal displacements of said quill member with respect to said crossbeam member in the direction of said opening.

24. A driver system as in claim 23 wherein said driver means comprises hydraulic piston means arranged in cylinder means formed in said crossbeam member in the vicinity of said slot and hydraulic switching valve means attached to one end of said crossbeam member and communicating to said cylinder means via hydraulic conduits formed in said crossbeam member.

25. A driver system as in claim 24 wherein said crossbeam member is further formed with hydraulic pressure and drain conduits extending therethrough between its said one end at said switching valve means and its other end for connection to external hydraulic pressure and drain sources respectively.

26. A driver system as in claim 24 wherein said hydraulic switching valve means includes electrohydraulic valve actuating means mounted on said one end of said crossbeam member.

27. In a driver system, the combination of means for generating electrical signals which vary according to a substantially square wave pattern at a controllable repetition rate and at a controllable overall amplitude, a main hydraulic valve element, electrohydraulic transducer means operable to control the position of said valve element according to said signals, an hydraulic circuit including said main valve element and having fluid flow passageways through which fluid flows in a direction and at a rate determined by the position of said main valve element, a piston and cylinder assembly included in said hydraulic circuit to be driven by the flow of said fluid, means reciprocally driven by said piston and cylinder assembly, displacement transducer means operable to produce signals representative of the displacements of said piston and cylinder means and feedback means arranged to degeneratively bias said square wave signals according to the average signal output of said displacement transducer means.

28. In a driver system the combination of an electrical oscillator for generating driver signals which vary repetitively in direction, means arranged to adjustably control the driver signal repetition rate of said oscillator, signal amplitude control means connected to the output of said oscillator, an electrohydraulic valve system controlled by driver signals from said signal amplitude control means, said electrohydraulic valve system including a main movable valve element and means for shifting the position of the element in accordance with the amplitude and direction of said driver signals, an hydraulic circuit including said main valve element and having hydraulic passageways through which the direction and rate of flow is controlled according to the position of said main valve element, piston and cylinder means included in said hydraulic circuit to be driven by said flow, a driver element connected to one portion of said piston and cylinder means and a massive reactance element connected to a second, relatively displaceable, portion of said piston and cylinder means, displacement transducer means for generating displacement signals representative of the displacements produced between said reactance element and said driver element and feedback means for degeneratively controlling said driver signals in accordance with the output of said displacement transducer means, said feedback means including low pass filter means arranged to feed back only signal frequency components below the output frequency of said oscillator.

29. A driving apparatus for applying oscillatory forces to a load in such a manner that the phase relationships between said forces and their resulting displacements are controllable independently of driving conditions, said apparatus comprising a source of energy, modulating means for converting said energy into mechanical vibrations, variable reactance means for controlling the phase relationship between forces and displacements passing therethrough, and means coupling said modulating means and said variable reactance means between said energy source and said load.

30. A driving apparatus as in claim 29 wherein said energy source is a hydraulic pump, said modulating means is a hydraulic valve and said coupling means is a hydraulic piston and cylinder assembly.

31. A driving apparatus as in claim 30 wherein said variable reactance means comprises a mass associated with said coupling means and a resilient means.

32. A driving apparatus as in claim 31 wherein said resilient means includes hydraulic fluid between said valve and said piston and cylinder assembly.

References Cited

UNITED STATES PATENTS

| | | | |
|---|---|---|---|
| 2,858,108 | 10/1958 | Wise et al | 175—56 |
| 2,893,692 | 7/1959 | Marx | 175—56 |
| 2,911,192 | 11/1959 | Boucher | 175—56 |
| 2,975,846 | 3/1961 | Bodine | 175—56 X |
| 3,106,258 | 10/1963 | Muller | 175—55 |
| 3,344,873 | 10/1967 | Baittinger | 175—19 X |
| 3,262,507 | 7/1966 | Hansen | 175—56 |

CHARLES E. O'CONNELL, *Primary Examiner.*

RICHARD E. FAVREAU, *Assistant Examiner.*

UNITED STATES PATENT OFFICE
CERTIFICATE OF CORRECTION

Patent No. 3,452,830                                        July 1, 1969

George J. Gendron et al.

It is certified that error appears in the above identified patent and that said Letters Patent are hereby corrected as shown below:

Column 1, lines 33 and 34, cancel "vibratory pile driving techniques involved the provision of". Column 4, line 5, "drive" should read -- driver --. Column 14, line 18, "can" should read -- said --; line 35, after "said", second occurrence, insert -- bias --.

Signed and sealed this 5th day of May 1970.

(SEAL)
Attest:

Edward M. Fletcher, Jr.                                  WILLIAM E. SCHUYLER, JR.
Attesting Officer                                             Commissioner of Patents